(12) United States Patent
Chang et al.

(10) Patent No.: US 6,656,628 B2
(45) Date of Patent: Dec. 2, 2003

(54) POWER GENERATING METHOD USING SEAWATER AND POWER GENERATING APPARATUS USING THE METHOD

(76) Inventors: Tao-Kuang Chang, 8F., 28, Lane 490, Hsin Tai Road, Hsinchuang, Taipei Hsien (TW); Chih-Shen Chen, 8F., 28, Lane 490, Hsin Tai Road, Hsinchuang, Taipei Hsien (TW)

( * ) Notice: Subject to any disclaimer, the term of this patent is extended or adjusted under 35 U.S.C. 154(b) by 136 days.

(21) Appl. No.: 09/911,486

(22) Filed: Jul. 25, 2001

(65) Prior Publication Data

US 2003/0022058 A1 Jan. 30, 2003

(30) Foreign Application Priority Data

Jul. 28, 2000 (JP) ........................................ 2000-229862

(51) Int. Cl.⁷ ........................... H01M 6/34; H01M 17/00
(52) U.S. Cl. ........................................ 429/119
(58) Field of Search .......................................... 429/119

(56) References Cited

U.S. PATENT DOCUMENTS

| 3,288,649 A | * | 11/1966 | McCallum | .................. | 136/100 |
| 3,829,539 A | * | 8/1974 | Blake | .......................... | 264/13 |
| 3,884,720 A | * | 5/1975 | Armstrong | ................... | 136/100 |
| 3,941,616 A | * | 3/1976 | Huhta-Kowisto | ........... | 136/100 |
| 3,953,238 A | * | 4/1976 | Honer | .......................... | 136/90 |
| 4,020,247 A | * | 4/1977 | Birt | ............................. | 429/119 |
| 4,332,864 A | * | 6/1982 | King | ............................. | 429/3 |

FOREIGN PATENT DOCUMENTS

| JP | 4-193926 | 7/1992 |
| JP | 5-230577 | 9/1993 |
| JP | 6-145859 | 5/1994 |
| JP | 6-212331 | 8/1994 |

* cited by examiner

Primary Examiner—Mark Ruthkosky
(74) Attorney, Agent, or Firm—Troxell Law Office PLLC

(57) ABSTRACT

A power generating method of generating power supply by: guiding seawater through a reaction tank having negative electrodes made of magnesium or aluminum alloy and a positive electrode made of silver chloride, cuasing the negative electrodes to produce the oxidizing reaction of $Mg \rightarrow Mg^{+2}+2e^-$ and the positive electrode to produce the reduction reaction of $2AgCl+2e^- \rightarrow 2Ag+2Cl^-$.

3 Claims, 3 Drawing Sheets

POWER GENERATING METHOD USING SEAWATER AND POWER GENERATING APPARATUS USING THE METHOD

BACKGROUND OF THE INVENTION

The present invention relates to a power generating method and, more particularly, to a method of generating power supply by means of the application of seawater.

The development of petroleum, coal, and petrochemical energy caused the Industrial Revolution. However, following fast development of the industry, the consumption of energy becomes more and more heavy. The application of natural resources to produce energy also produce waste gases that contain carbon, nitrogen, sulfur, and/or other different chemical compounds. The exhaust substances may cause a severe environmental pollution problem. In order to reduce environmental pollution, green battery energy is promoted. A battery uses hydrogen and oxygen to make a chemical reaction, to further produce electricity. Because electric energy is directly obtained from the chemical reaction, battery energy has the advantages of low pollution and high efficiency.

SUMMARY OF THE INVENTION

The present invention has been accomplished under the circumstances in view. It is the main object of the present invention to provide a power generating method, which uses seawater to generate electricity. According to the present invention, a reaction tank is prepared having a seawater inlet and a seawater outlet for circulation of seawater, and positive electrode of silver chloride and negative electrodes of magnesium or aluminum alloy are installed in the reaction tank and separated by electrically insulative means. Upon circulation of seawater through the reaction tank, the negative electrodes are caused to produce the oxidizing reaction of $Mg \rightarrow Mg^{+2}+2e^-$, and the positive electrode is caused to produce the reduction reaction of $2AgCl+2e^- \rightarrow 2Ag+2Cl^-$, and therefore electric energy is obtained from the output terminals of the electrodes.

DETAILED DESCRIPTION OF THE PREFERRED EMBODIMENT

Figure 1:
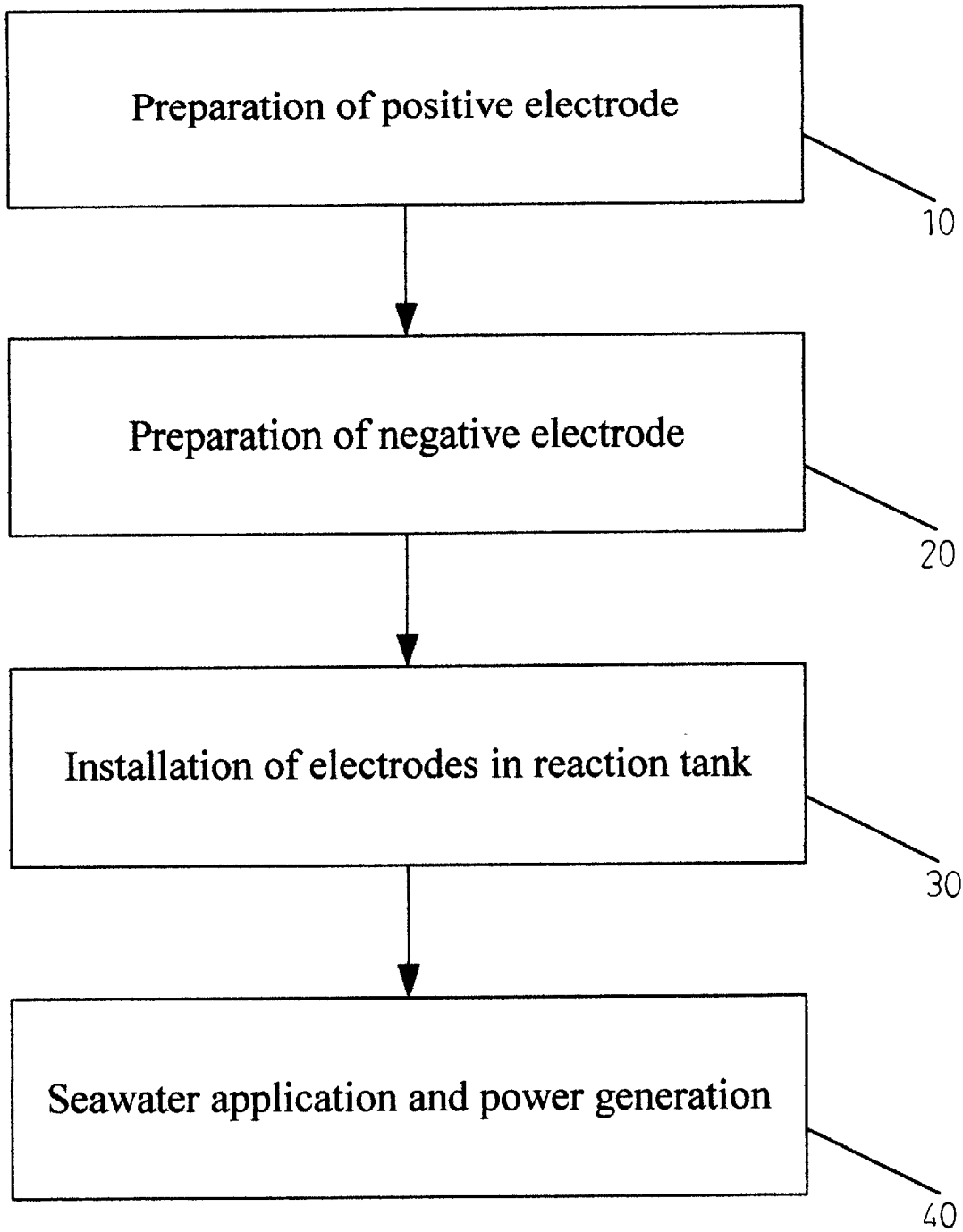
FIG. 1 is a flow chart explaining the procedure of the power generating method of the present invention.

Referring to FIG. 1, the power generating method of the invention comprises the steps of:

10 preparation of positive electrode, where a positive electrode is made by means of using silver chloride (AgCl) as reduction reaction material;

20 preparation of negative electrode, where a negative electrode is made of magnesium alloy or aluminum alloy by stamping;

30 installation of electrodes in reaction tank, where the prepared positive electrode and negative electrode are installed in a reaction tank, which comprises a seawater inlet, a seawater outlet in fluid communication with the seawater inlet, and a polymeric isolation layer separating the positive electrode from the negative electrode; and 40 seawater application and power generation, where seawater is guided into the seawater inlet of the reaction tank toward the seawater outlet for use as electrolyte, causing the positive electrode to produce the oxidizing reaction of $Mg \rightarrow Mg^{+2}+2e^-$ and the positive electrode to produce the reduction reaction of $2AgCl+2e^- \rightarrow 2Ag+2Cl^-$, so as to obtain electric energy from the output of the electrodes.

Figure 2:
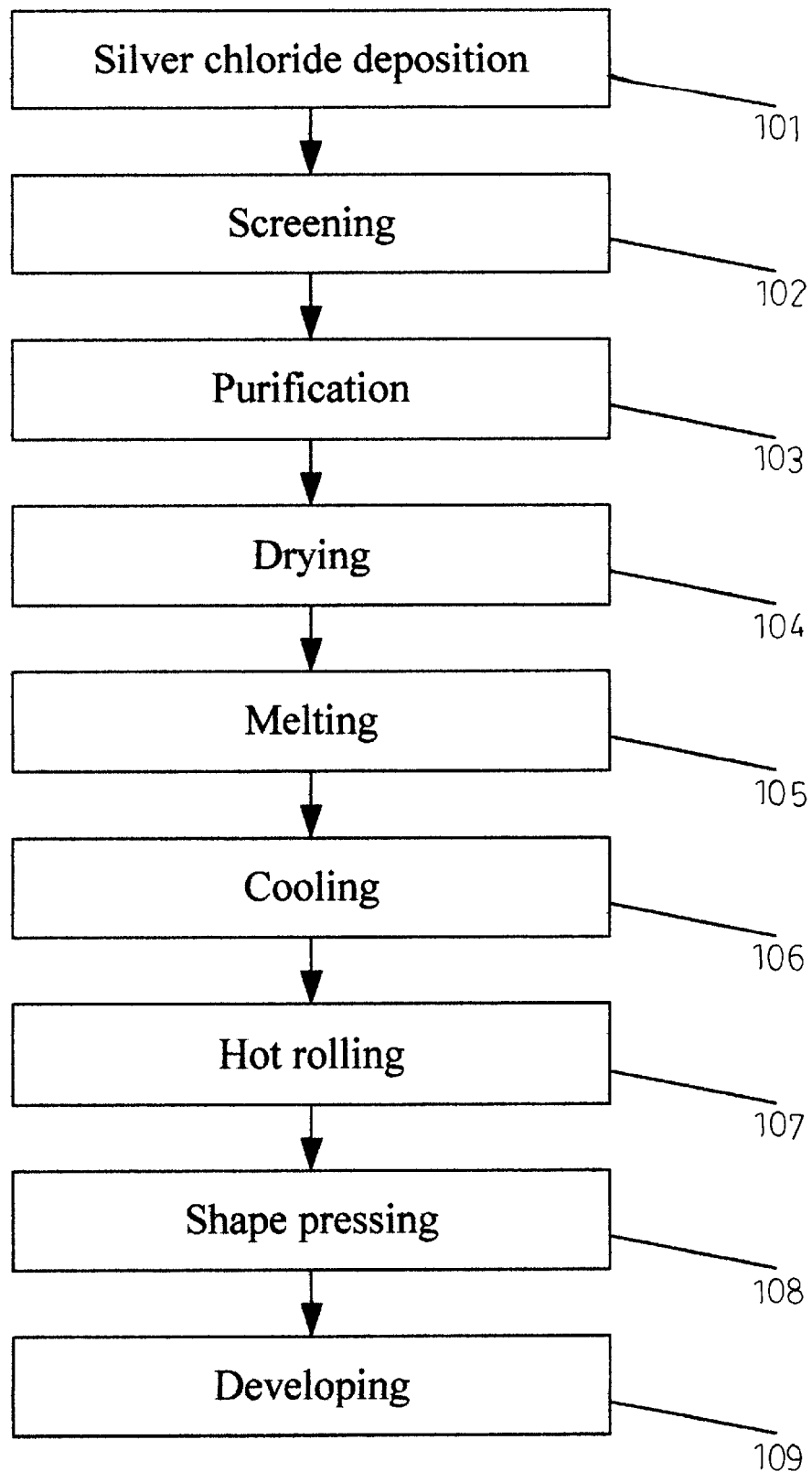
FIG. 2 is a flow chart explaining the fabrication of the positive electrode according to the present invention.

Referring to FIG. 2, the fabrication of the aforesaid positive electrode includes the steps of:

silver chloride (AgCl) deposition, where silver ingot is dissolved in nitric acid ($HNO_3$) solution to produce silver nitrate ($AgNO_3$), and then sodium chloride (NaCl) powder is added to silver nitrate ($AgNO_3$) to produce silver chloride (AgCl) deposition.

102 screening, where silver chloride (AgCl) deposition is boiled and then screened to remove impurity;

103 purification, where silver chloride (AgCl) deposition is purified into high purity silver chloride (AgCl) deposition;

104 drying, where high purity silver chloride (AgCl) deposition is dried into silver chloride powder;

105 melting, where silver chloride powder is melted in a mold;

106 cooling and mold-stripping, where molten silver chloride is cooled down and removed from the mold;

107 hot rolling, where solid silver chloride thus obtained is treated through a hot rolling process;

108 shape pressing and 109 developing, where hot-rolled silver chloride is processed into the desired shape.

Figure 3:
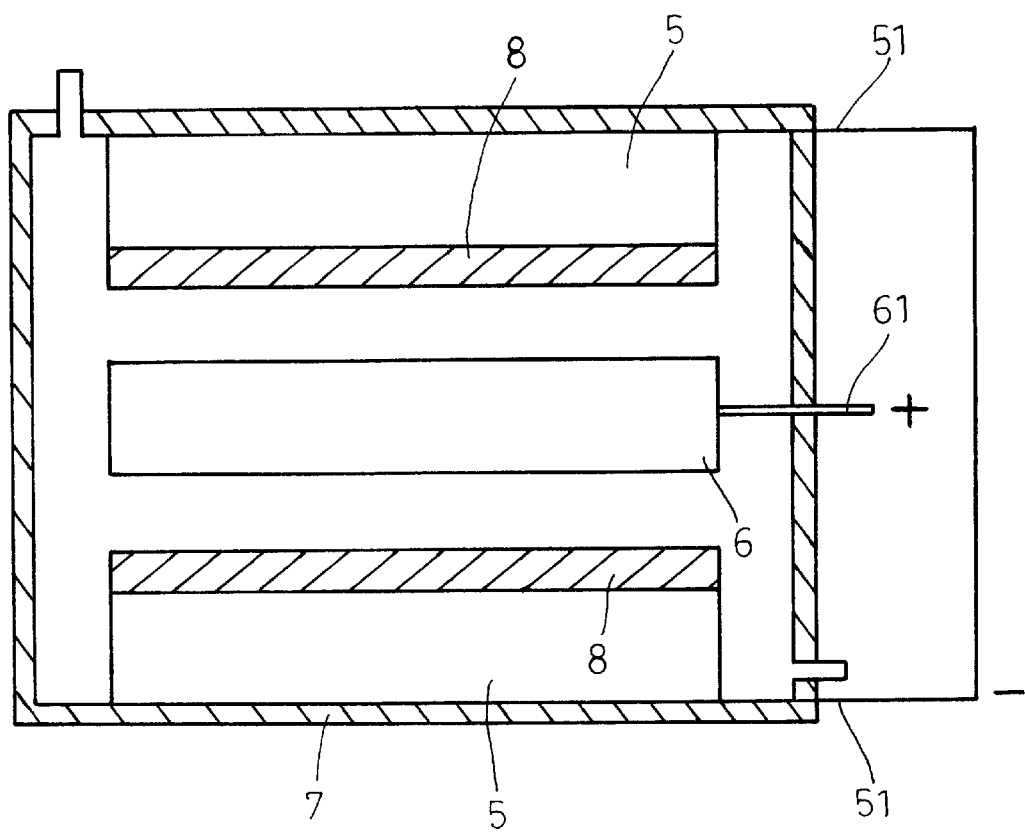
FIG. 3 is a sectional view of a seawater battery constructed according to the present invention

Referring to FIG. 3, a seawater battery is shown comprising a reaction tank 7, two negative electrodes 5 respectively mounted in top and bottom sides inside the reaction tank 7, a negative output terminal 51 made of a conductor wire and connected between the negative electrodes 5 and suspending outside the reaction tank 7, a positive electrode 6 mounted inside the reaction tank 7 and equally spaced between the negative electrodes 5, a positive output terminal 61 made of a nickel plate and fastened to the positive electrode 6 by spot welding and extended out of the reaction tank 7, and a polymeric isolation layer 8 mounted inside the reaction tank 7 to prevent electric contact between the positive electrode 6 and the negative electrodes 5.

Seawater is filled in the reaction tank 7 and used as an electrolyte. Because seawater contains several chemical elements including magnesium chloride ($MgCl_2$) and sodium chloride (NaCl), it is suitable for use as an electrolyte for the battery. When seawater flows from the seawater inlet of the reaction tank 7 toward the seawater outlet, the negative electrodes 5 are caused to produce the oxidizing reaction of $Mg \rightarrow Mg^{+2}+2e^-$ and to discharge electrons, and the positive electrode 6 is caused to produce the reduction reaction of $2AgCl+2e^- \rightarrow 2Ag+2Cl^-$ and to gain electrons. Therefore, the negative output terminal 51 of the negative electrodes 5 outputs negative voltage, and the positive output terminal 61 of the positive electrode 6 outputs positive voltage. This design of seawater battery is practical for use in a small-scale power generator or power propeller. Further, multiple seawater battery can be connected in series or in parallel for use in a big scale power plant.

What the invention claimed is:

1. A power generating method comprising the steps of:
   a) preparing a positive electrode by using silver chloride (AgCl) as a reduction reaction material;
   b) preparing two negative electrodes from a material selected from the group consisting of magnesium alloy and aluminum alloy by stamping, each negative electrode having a polymeric isolation layer;

c) installing the positive electrode and negative electrode in a reaction tank having a seawater inlet and a seawater outlet such that the positive electrode is located between and spaced from the two negative electrodes, the polymeric isolation layers of each negative electrode facing the positive electrode; and d) filling the tank with seawater for use as an electrolyte, and producing electric energy by causing the positive electrode to produce the oxidizing reaction of $Mg \rightarrow Mg^{+2}+2e^-$ and the positive electrode to produce the reduction reaction of $2AgCl+2e^- \rightarrow 2Ag+2Cl^-$, so as to obtain electric energy from the output of the electrodes.

2. The power generating method of claim 1, wherein said positive electrode is made by an electrode fabrication method including the steps of:

a) producing a silver chloride (AgCl) deposition by dissolving a silver ingot in a nitric acid ($HNO_3$) solution to produce silver nitrate ($AgNO_3$), and then adding sodium chloride (NaCl) powder to the silver nitrate ($AgNO_3$) to produce the silver chloride (AgCl) deposition;

b) boiling and screening the silver chloride (AgCl) deposition to remove impurities;

c) purifying the silver chloride (AgCl) deposition to obtain a high purity silver chloride (AgCl) deposition;

d) drying the high purity silver chloride (AgCl) deposition to produce a silver chloride powder;

e) melting and molding the silver chloride powder;

f) cooling and mold-stripping the molded silver chloride from the mold;

g) hot rolling the solid silver chloride; and h) shape pressing and developing the hot-rolled silver chloride into a finished product having a predetermined shape.

3. A seawater battery comprising:

a) a reaction tank having a seawater inlet and a seawater outlet for circulation of seawater through the reaction tank;

b) two negative electrodes made of alloy material selected from a group of materials consisting of magnesium alloy and aluminum alloy, a first negative electrode being mounted on a top of the reaction tank and a second negative electrode being mounted on a bottom of the reaction tank;

c) a negative output terminal made of a conductor wire and connected between the negative electrodes and extending outside the reaction tank;

d) a positive electrode made of silver chloride (AgCl) and mounted inside the reaction tank and equally spaced between the two negative electrodes;

e) a positive output terminal made of a nickel plate and connected to the positive electrode and extending out of the reaction tank; and f) a polymeric isolation layer mounted on each of the two negative electrodes and facing toward the positive electrodes to prevent electrical contact between the positive electrode and the two negative electrodes.

* * * * *